United States Patent [19]

Lisak

[11] Patent Number: 5,077,642
[45] Date of Patent: Dec. 31, 1991

[54] HORIZONTAL ZERO ADJUSTER FOR AUTOMOTIVE HEADLAMP

[75] Inventor: Stephen P. Lisak, Arab, Ala.

[73] Assignees: Ryder International Corporation, Arab, Ala.; Textron Inc., Providence, R.I. ; part interest to each

[21] Appl. No.: 586,600

[22] Filed: Sep. 21, 1990

[51] Int. Cl.$^5$ .......................................... F21M 3/20
[52] U.S. Cl. ................................... 362/66; 362/289; 362/80
[58] Field of Search .................... 362/61, 66, 80, 287, 362/428; 33/365, 370, 288

[56] References Cited

U.S. PATENT DOCUMENTS

| 1,609,634 | 12/1926 | Ryan | 33/370 |
| 2,058,743 | 10/1936 | Trippe | 362/311 |
| 3,612,854 | 11/1968 | Todd et al. | 33/288 |
| 4,660,128 | 4/1987 | Bergin et al. | 362/80 |
| 4,674,018 | 6/1987 | Ryder et al. | 362/424 |
| 4,751,617 | 6/1988 | Ryder et al. | 362/61 |
| 4,794,495 | 12/1988 | McMahan et al. | 362/66 |
| 4,802,067 | 1/1989 | Ryder et al. | 362/61 |
| 4,922,387 | 5/1990 | Ryder et al. | 362/61 |
| 4,984,136 | 1/1991 | Yamagishi et al. | 362/6 C |

Primary Examiner—Ira S. Lazarus
Assistant Examiner—Richard R. Cole
Attorney, Agent, or Firm—Trexler, Bushnell, Giangiorgi & Blackstone, Ltd.

[57] ABSTRACT

A headlamp aiming apparatus is provided for attachment to an automotive headlamp assembly comprising a support member which is rigidly mountable to an automotive vehicle, a reflector which is mounted to the support member for pivotal motion about at least one of a horizontal axis and a vertical axis for aiming of the headlamp beam, and a headlamp adjusting assembly operatively coupled with the support member for aiming of the headlamp beam. The aiming apparatus comprises a first aiming indicia movable in unison with the headlamp adjusting assembly and a second aiming indicia independent of the headlamp adjusting assembly. An indicator alignment arrangement moves one of the first and second indicia independently of the headlamp adjusting means for bringing the first and second aiming indicia into registry with each other when the reflector is in a condition wherein the beam is aimed as desired responsive to adjustment by the headlamp adjusting assembly. The headlamp adjusting assembly may be adjusted thereafter as necessary until the aim-indicating arrangement indicates the aimed condition to thereby assure proper subsequent aiming of the headlamp beam.

15 Claims, 5 Drawing Sheets

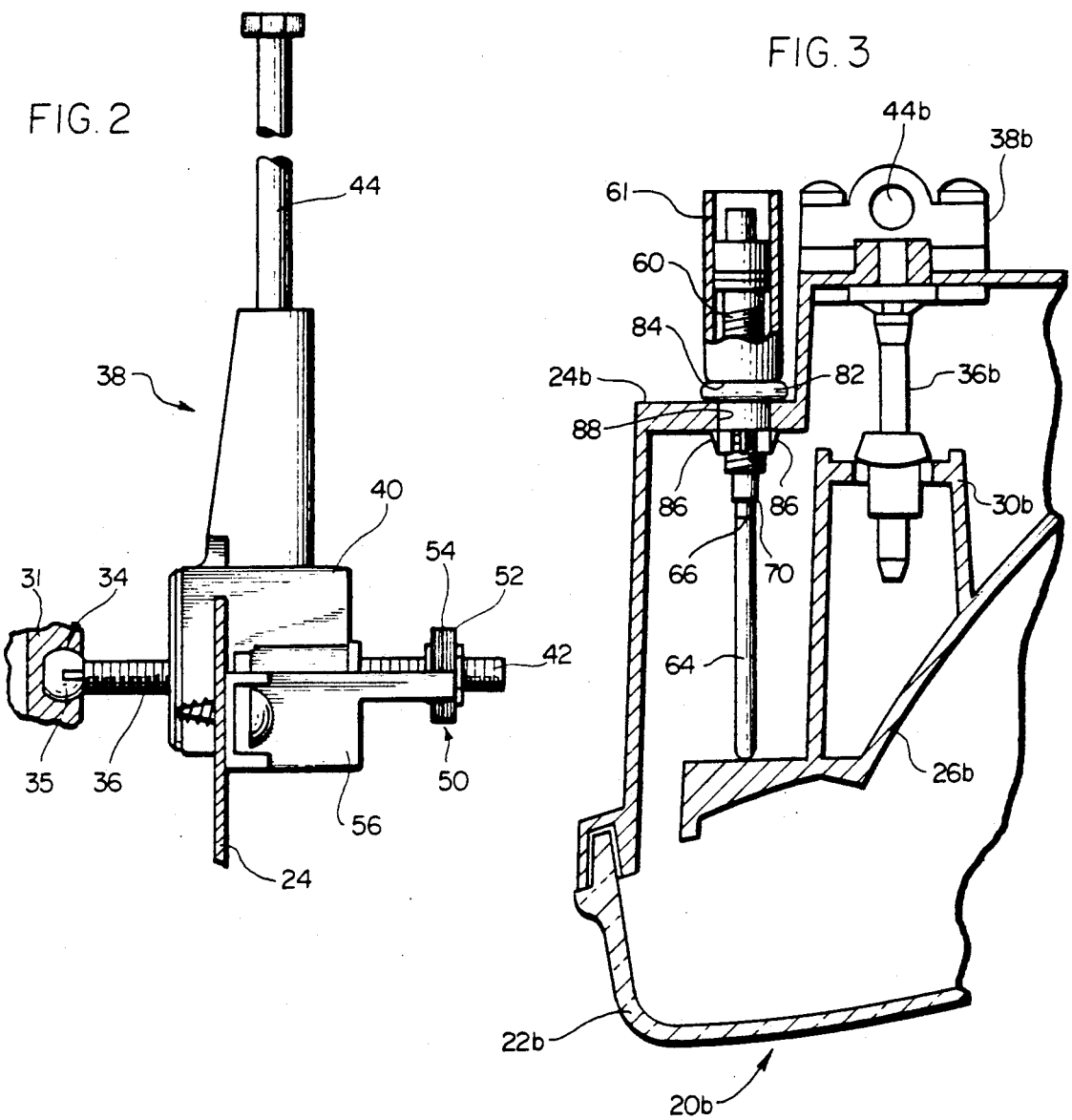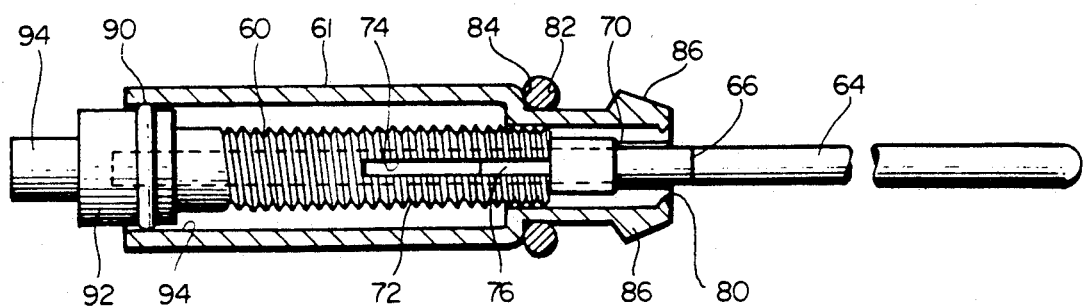

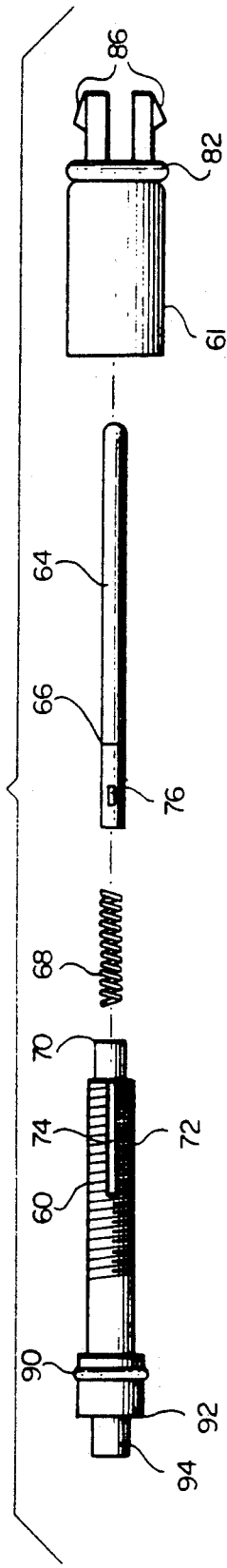
FIG. 5
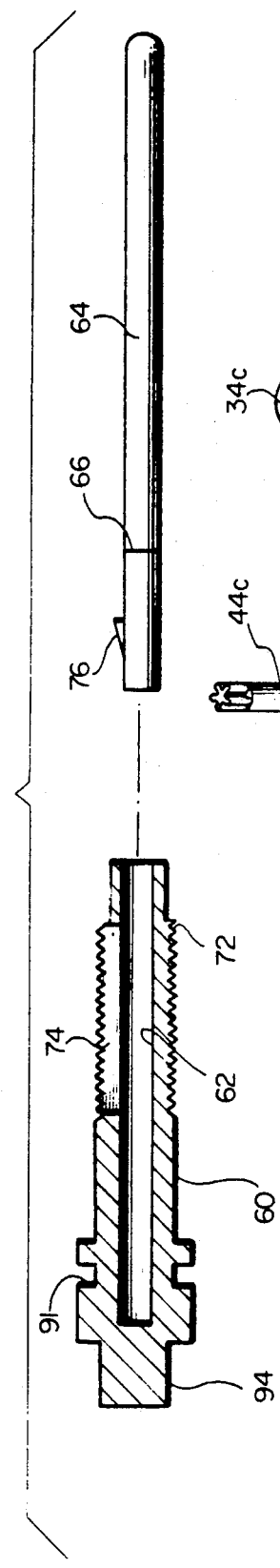
FIG. 6
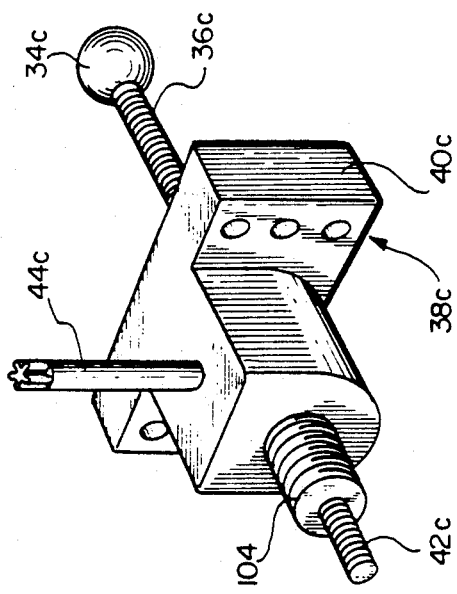
FIG. 7
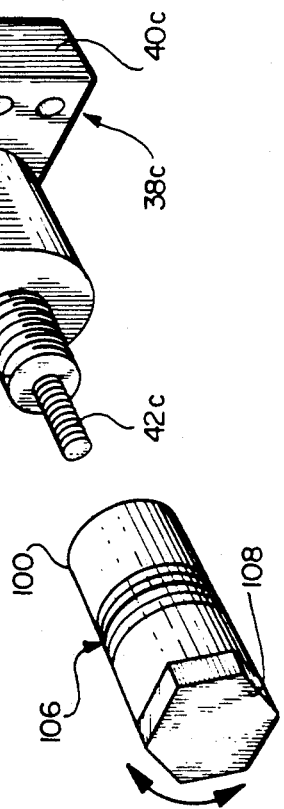

HORIZONTAL ZERO ADJUSTER FOR AUTOMOTIVE HEADLAMP

BACKGROUND OF THE INVENTION

This invention relates generally to adjustable automotive headlamp assemblies, and more particularly to a novel and improved headlamp aiming apparatus for facilitating the proper aiming of a headlamp beam upon installation of a headlamp on an automotive vehicle, or at any time thereafter.

A number of headlamp adjusting and aiming systems have been heretofore proposed for automotive vehicles For example, separately mounted sealed-beam type headlamps commonly require independent adjustment utilizing adjusting screws or the like.

However, other types of headlamp assemblies are now being used which provide unitary housing or frame and lamp assemblies which are designed to fit aerodynamically styled automotive body contours. Such modern headlamp assemblies may include various automated or semi-automated adjusting mechanisms for adjusting both vertical and horizontal positions or angular orientations of the lamp for aiming the light beam.

However there has heretofore been no relatively simple arrangement to obtain the proper aiming of a headlamp beam by adjustment of the headlamp angular position, once the headlamp has been installed on the automotive vehicle. Rather, it has heretofore generally been necessary to follow a time-consuming procedure to achieve proper headlamp aiming. This procedure generally requires placing the vehicle on a level surface and utilizing either a special instrument or a standardized aiming target. Often, access to the adjustment screws or other adjusting means is difficult and requires partial disassembly, specialized tools, and the like. As such, it has heretofore been difficult or impossible for the consumer or, indeed, anyone without access to the required equipment, instruments, tools or the like to achieve proper headlamp aiming.

In prior U.S. Pat. No. 4,802,607 issued Jan. 31, 1989, there is disclosed a novel level-indicating device which can be easily installed or mounted to the headlamp assembly during manufacture of the same and is thereafter movable in unison with the headlamp so as to indicate when the headlamp is in a level (i.e., up-down tilting) condition. This level indicating device generally utilizes a spirit or "bubble"-type of level which is initially movable relative to the headlamp, such that the headlamp can be factory adjusted (i.e., by tilting up or down as necessary) to the desired level condition on a test fixture or the like. Thereupon, the leveling device is adjusted until the bubble level indicates a level condition. The device is then rigidly fixed relative to the headlamp and/or housing such that it cannot be further moved or adjusted relative thereto. Accordingly, the consumer or other installer can thereafter readily relevel the headlamp relative to a vehicle standing on a level surface by merely adjusting the pitch or aiming of the headlamp until this level-indicating device or bubble level once again indicates a level condition. This then assures that the headlamp itself and more particularly the headlamp beam is at its desired level condition.

As a further feature of the aforesaid prior patent, there was developed a device which includes an angled or prism-like housing for permitting viewing of the level-indicating device or bubble level from a convenient location on the vehicle. Usually, this location is from the front of the vehicle and the corresponding front surface of the headlamp or headlamp assembly. It will be appreciated, however, that the bubble-type level will have its axis normally inclined perpendicular or at right angles to this front surface for the desired leveling and level-indicating function.

The present invention provides an additional aiming or aim-indicating device or apparatus. This additional apparatus is generally for indicating a so-called "zero" horizontal or properly aimed position of a headlamp beam in a left-to-right or side-to-side fashion. One such apparatus is disclosed in the prior patent to Ryder et al, U.S. Pat. No. 4,922,387 issued May 1, 1990. The present invention offers a somewhat different approach. Preferably, the present invention also provides means for visual inspection of the aiming device to assure or facilitate proper aiming of the headlamp. The present invention contemplates providing such an aiming indicator for a headlamp either independently or in connection with the adjustment assembly for achieving the left-right or side-to-side aiming of the headlamp.

OBJECTS AND SUMMARY OF THE INVENTION

Accordingly, it is an object of the invention to provide a novel and improved headlight aiming apparatus for use in aiming a headlamp beam of a headlamp of an automotive vehicle.

Briefly, and in accordance with the foregoing objects, a headlamp aiming apparatus a headlight aiming apparatus is provided for attachment to an automotive headlamp assembly comprising a support member which is rigidly mountable to an automotive vehicle, a reflector which is mounted to the support member for pivotal motion about at least one of a horizontal axis and a vertical axis for aiming of the headlamp beam, and headlamp adjusting means operatively coupled with said headlamp for producing movement of said reflector relative to said support member for aiming of the headlamp beam; said aiming apparatus comprising: aim-indicating means comprising a first aiming indicia movable in unison with said headlamp adjusting means and a second aiming indicia independent of said headlamp adjusting means; said indicator alignment means for moving one of said first and second indicia independently of said headlamp adjusting means for gringing the first and second aiming indicia into registry with each other when the reflector is in a condition wherein the beam is aimed as desired responsive to adjustment by said headlamp adjusting means; whereby said headlamp adjusting means may be adjusted thereafter as necessary until said aim-indicating means indicaties said aimed condition to thereby assure proper subsequent aiming of the headlamp beam.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawing in which like reference numerals identify like elements, and in which:

FIG. 2 is a side elevation of the apparatus of the invention, taken generally along line 2—2 of FIG. 1;

FIG. 3 is a partial top plan view, partially in section, of an alternate embodiment of an apparatus in accordance with the invention in connection with a headlamp assembly;

FIG. 4 is an enlarged section taken through the embodiment of FIG. 3;

FIG. 5 is an exploded view of the embodiment of FIGS. 3 and 4;

FIG. 6 is an enlarged, partial exploded view, partially in section, of the embodiment of FIGS. 3, 4 and 5;

FIG. 7 is an exploded perspective view of yet a further embodiment of a headlamp aiming or horizontal "zero" adjustment apparatus in accordance with the invention;

DESCRIPTION OF THE ILLUSTRATED EMBODIMENT

Figure 1:
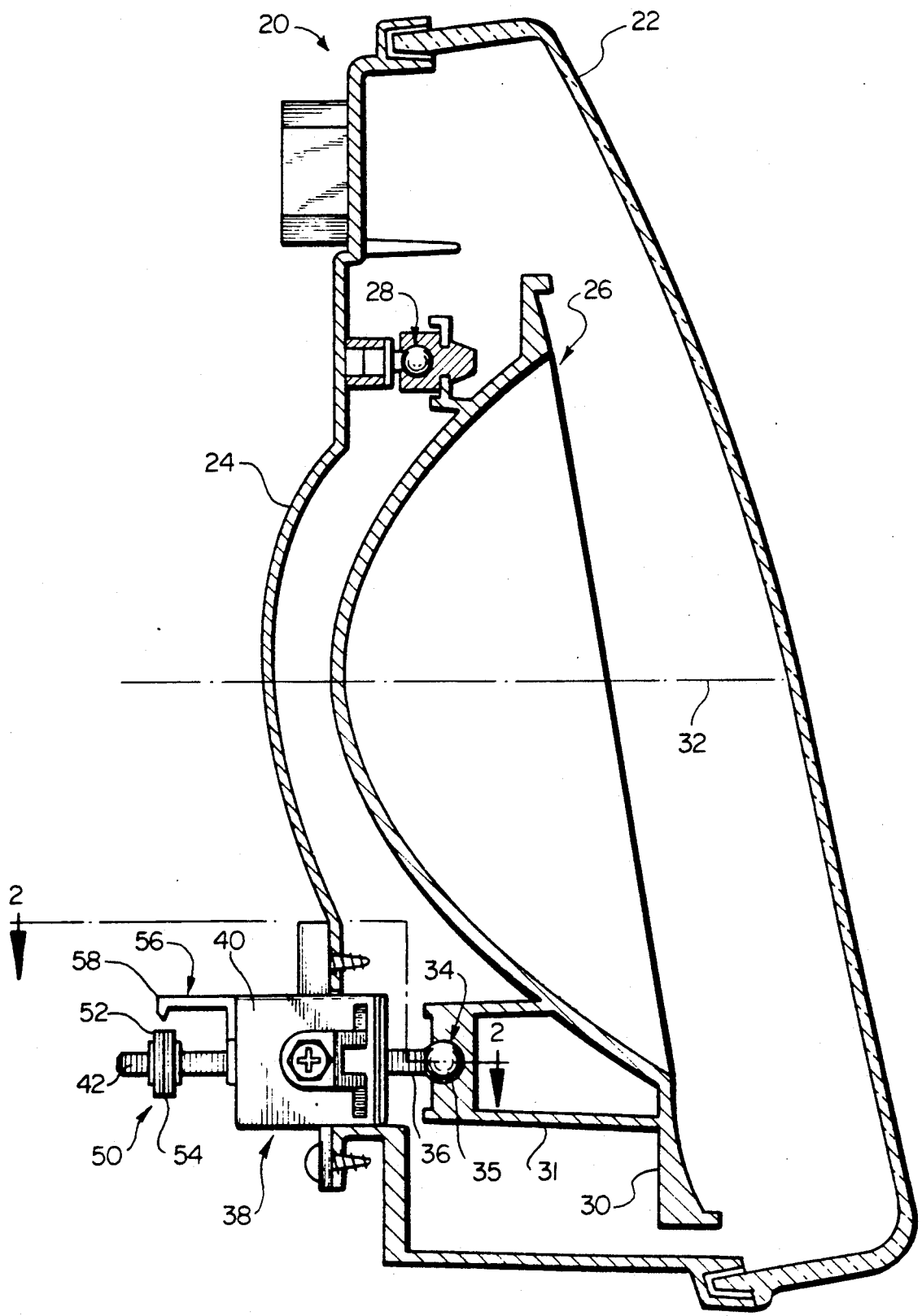
FIG. 1 is a top plan view, partially in section, illustrating the aiming or horizontal "zero" adjustment apparatus of the invention in connection with an exemplary headlamp assembly.

Referring now to the drawings, and initially to FIG. 1, there is shown a typical headlamp assembly which comprises an external housing 20 including a front transparent lens portion 22 and a rear shell or support member or portion 24. Within this housing 20 is mounted a headlamp 26 which, in the illustrated embodiment has been shown as the reflector portion of the headlamp. In order to aim the headlamp beam, the reflector portion 26 is mounted for pivotal motion about both its horizontal and vertical axes. In the illustrated embodiment, only the arrangement for horizontal or side-to-side aiming of the reflector is shown. The reflector is mounted to pivot about a first ball joint 28 in response to bidirectional movement of an opposite end portion 30 thereof in a direction generally coaxial with a central through axis 32 thereof. The opposite end 30 of the headlamp is formed with a suitable support strut or frame-like portion 31 to accept a coupling end 34 of an elongate threaded member 36 of an adjustment apparatus or assembly 38. The coupled end portion 34 and the cooperating portion of frame-like projecting member or portion 31 also preferably form a ball joint.

Generally speaking, the headlamp adjusting means 38 comprises a fixed member or housing 40 which is fixed or nonmovably mounted relative to the headlamp reflector 26. In the illustrated embodiment, this fixed housing portion 40 is rigidly mounted to the support member or rear housing shell portion 24. However, the housing 40 may be mounted to any other fixed surface, such as a vehicle frame or the like, without departing from the invention. The headlamp adjusting means or assembly 38 further includes the previously mentioned elongate threaded adjustment member 36 which terminates in a ball portion 35 of the ball-joint 34 at its one end, and has an opposite free end 42 which extends through the housing 40 and out the opposite end thereof. Further details of the assembly 38 are also shown in FIG. 2, to which reference is also invited.

Preferably, the adjustment means or assembly 38 comprises a gearbox assembly (not shown) which is mounted within housing 40 to generally convert rotation of a first outwardly projecting shaft member 44 thereof into rotation by the elongate threaded adjustment member 36 to achieve adjustment of the headlamp from a point remote from the actual location of the housing 40. Generally speaking, this involves translation of rotational motion at right angles, and bevel or crown-type gears are generally utilized within housing 40 for achieving the necessary translation of rotational motion.

Figure 9:
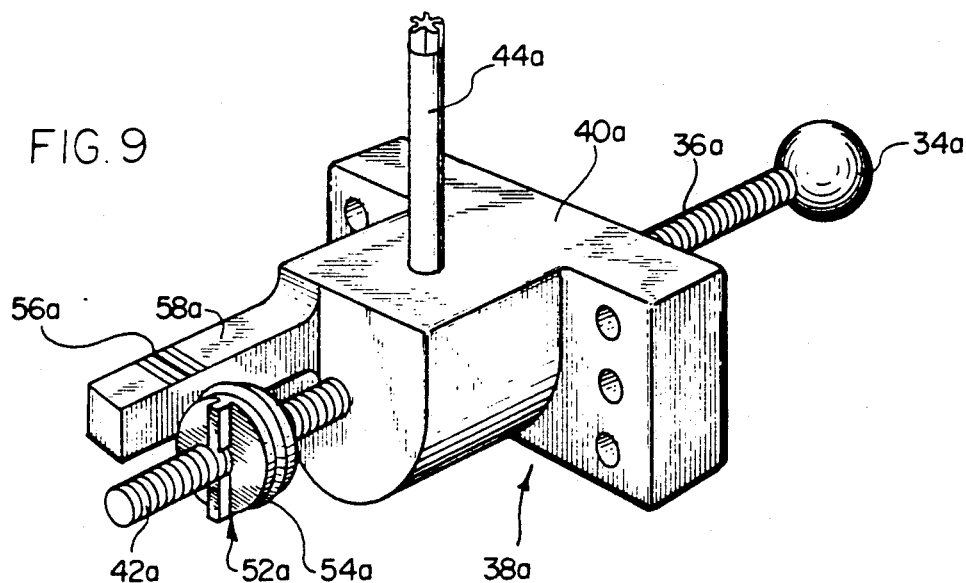
FIG. 9 is a perspective view of a somewhat modified form of the embodiment of FIGS. 1 and 2.

In accordance with one embodiment of the invention, an aim-indicating means, generally designated by reference numeral 44, is arranged for a predetermined response to movement of the surface or reflector 26 of the headlamp as it moves in unison with the adjusting member 36 of the assembly 38. In the embodiment illustrated in FIGS. 1, 2 and 10, as well as a somewhat alternate embodiment illustrated in FIGS. 9 and 11, this same indicating means 50 takes the form of an indicator body 52 which has first indicia means 54 thereupon and which is threadedly engageable with the projecting end portion 42 of the elongate threaded adjustment member 36. In the embodiment of FIGS. 9 and 11, like reference numerals are used with the suffix a to designate like parts and components.

Cooperatively, a second, complementary indicia means 56 is provided, the second or complementary indicia means being alignable with the indicia means 54 for indicating a properly aligned or aimed condition of the headlamp or reflector portion 26 thereof. The second, complementary indicia means in the embodiments illustrated herein comprises a fixed outwardly extending arm or projection 58 having a pointer or arrow 56 (FIG. 10) or lines 56a (FIG. 11) inscribed or otherwise formed thereon. Accordingly, upon movement of the headlamp adjusting member 36, 36a the first indicia 54 or 54a will be seen to move in unison therewith while the headlamp is aimed. Thereafter, and in accordance with the invention, the indicia 54 or 54a, is further moved independently of the headlamp adjusting member 36 or 36a to align the respective indicia 54 and 56 or 54a and 56a. This alignment is indicated respectively in FIGS. 10 and 11.

Figure 10:
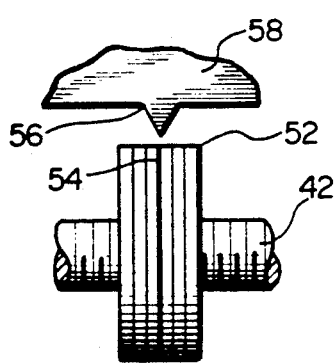
FIG. 10 is an enlarged elevational view of a portion of the embodiment of FIGS. 1 and 2.
Figure 11:
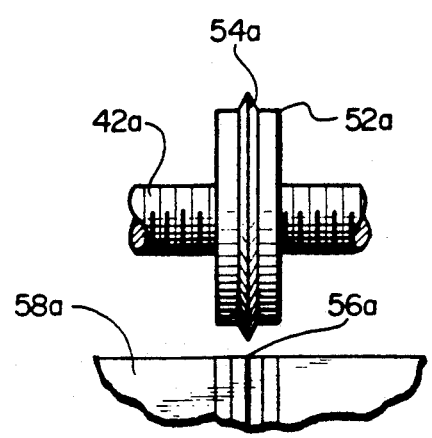
FIG. 11 is an enlarged elevational view of a portion of the embodiment of FIG. 9.

It will be noted that the only difference between the two embodiments illustrated respectively in FIGS. 1, 2 and 10, and in FIGS. 9 and 11, is in the form of the indicia utilized, one of the two indicia preferably consisting of a pointer 56 or similar raised surface, and the other preferably consisting of one or more inscribed marks or lines 56a or a scale against which the pointer-like indicia 54a is relatively movable. It will be noted that in the embodiments illustrated herein, it is the indicia members 54, 54a on the indicator bodies 52, 52a which are further movable independently of the adjusting means 36, 36a. However, these members could remain fixed with respect to the adjustment member 36a and the complementary indicia 56, 56a could be made relatively movable without departing from the invention.

Accordingly, the relatively movable one of the indicia means 54, 56 or 54a, 56a comprises an indicator alignment means for causing the aim-indicating means (i.e., the indicia themselves) to indicate an aimed condition of the headlamp when the headlamp is in a condition wherein the headlamp beam is aimed as desired responsive to adjustment by the headlamp adjusting means or assembly 38. The headlamp adjusting means or assembly 38 may thereafter be adjusted as necessary until the aim-indicating means comprising indicia 54, 56 or 54a, 56a indicate the aimed condition to thereby assure proper subsequent aiming of the headlamp beam. This eliminates the necessity to thereafter use specialized aiming fixtures, targets and the like which require additional complex and cumbersome procedures in order to achieve proper aiming.

Turning now to FIGS. 3-6, yet a further embodiment of an aiming apparatus in accordance with the invention is illustrated. The like parts and components of the headlamp assembly and headlamp adjusting assembly are indicated in FIG. 3 by like reference numerals with the suffix b. In the embodiment illustrated in FIGS. 3-6, the aim indicating means includes a housing 60 which is mounted closely adjacent the adjusting means 38b. In the illustrated embodiment, housing 60 is mounted to the same support or headlamp shell member 24b as the adjustment assembly 38b. The housing 60 is mounted to support member 246 by means of a mounting member 61 to be described in further detail hereinbelow.

Housing 60 defines therewithin an elongate cavity 62. An elongate indicator member 64 is mounted for slidable movement relative to the housing 60 and within cavity 62 and an indicia means or mark 66 is formed or inscribed or otherwise marked upon a surface of the elongate indicator member 64. Resilient means, which in the illustrated embodiment takes the form of an elongate compression-type spring member 68 are mounted in the cavity 62 for bearing against an end portion of the indicator member 64 to generally urge the same into a direction for engagement of its opposite end with the headlamp, and in particular with the rear surface of the headlamp reflector portion 26b as best viewed in FIG. 3. This engagement is such that as the headlamp adjusting means 38b operates to move the headlamp reflector 26b is moved thereby, the indicator member 64 and hence the indicia 66 will also be moved in unison with the headlamp, and particularly with reflector 26b thereof.

In order to give an indication of the aimed condition of the headlamp, a second indicia means comprising a mark on a fixed surface alignable with the indicator member 64, and in particular with the indicia mark 66 thereupon, is provided. In the embodiment of FIGS. 3-6, this second mark or indicia means comprises an end part 70 of the housing 60. It will be noted that the position of mark 66 relative to the end surface 70 may be readily observed at any time.

Cooperatively, when the headlamp or reflector 26b is in its desired aimed condition, the housing 60 is preferably moved coaxially with indicator 64 relative to its mounting member 61 and to the mounting or support surface 24b to achieve alignment of the end surface 70 with the mark or indicia 66. In the illustrated embodiment, this is accomplished by providing an external screw-type thread 72 to the housing 60 and a complementary internal thread 80 in the mounting means or member 61, whereby the housing 60 is bidirectionally movable relative the the indicator member 64. In this manner, when the desired aimed condition of the headlamp has been achieved, the housing 60 may be threadably moved until the indicia mark 66 is aligned with the end surface 70 thereof. The headlamp may thereafter be aimed by adjusting the headlamp adjusting means until the mark 66 again comes into alignment with the end surface 70, to thereby assure subsequent aiming of the headlamp beam.

In accordance with a further feature of the embodiment of FIGS. 3-6, further retaining means are defined respectively on the indicator 64 and housing 60 for retaining at least a portion of the indicator 64 within the housing and for defining a limit of movement of the indicator in the direction outwardly of the housing. In the illustrated embodiment, these latter means comprise an elongate slot 74 formed in an outer wall portion of the housing 60 and a complementary outwardly projecting barb 76 formed on an end part of the indicator member 64 to be retained within slot 74.

As best viewed in FIGS. 3 and 5, the mounting means or mounting member 61 comprises an elongate tubular, open-ended body of complementary configuration for receiving the housing 60 therewithin. Preferably, and as best viewed in FIG. 4, a terminal end portion of the mounting member 61 includes the thread 80 of complementary form for engagement with the thread 72 of the housing 60.

Accordingly, the housing 60 is bidirectionally movable generally coaxially with the indicator member 64 for advancing and retracting of the end surface 70 thereof relative to the indicia mark 66. In assembled condition, the housing preferably extends at least a few threads outwardly of the end of the mounting member 61 at all times.

The mounting member 61 also mounts a sealing member or gasket 82 about a shoulder portion 84 thereof for sealing engagement against an outer surface of the headlamp shell or support member 24b. To this end, the mounting member 61 also includes a forwardly located support surface engaging portion comprising resilient, radially outwardly projecting locking members 86 which are located for compressing the gasket into sealing engagement with the exterior surface of support 24b when the locking members 86 have engaged with the interior surface thereof. Accordingly, the locking members 86 are generally radially spaced apart to provide a relief area for inward compression thereof for initial passage through a complementary through opening 88 in the support member 24b and for thereafter resiliently returning into engagement with the interior surface thereof, while simultaneously compressing the gasket 82 to achieve a seal about the opening 88. In order to preserve the sealing arrangement thus obtained, a further gasket 90 is mounted about an enlarged rearwardly projecting end portion 92 of the housing 60 for slidable sealing engagement with an inner wall surface 94 of the mounting means or member 61. The gasket 90 is held in a circumferential groove 91.

In order to facilitate rotation for initial adjustment of the housing to align the end 70 thereof with the indicia marking 66, a projecting driver head end portion 94 is provided on the housing suitable for engagement by a tool of complementary form. Preferably, upon assembly and in use, as best viewed in FIG. 3, this driver head portion 94 is recessed within the mounting member 61 so as to discourage further contact therewith and rotation thereof following the initial adjustment. It will be remembered that thereafter, the further adjustment for aiming of the headlamp or reflector 26b is to be had exclusively by way of the headlamp adjustment assembly 38b to again achieve an aligned condition between the indicia mark 66 and end surface 70 of the housing 60 to indicate a return of the headlamp to its initial aimed condition.

Figure 8:
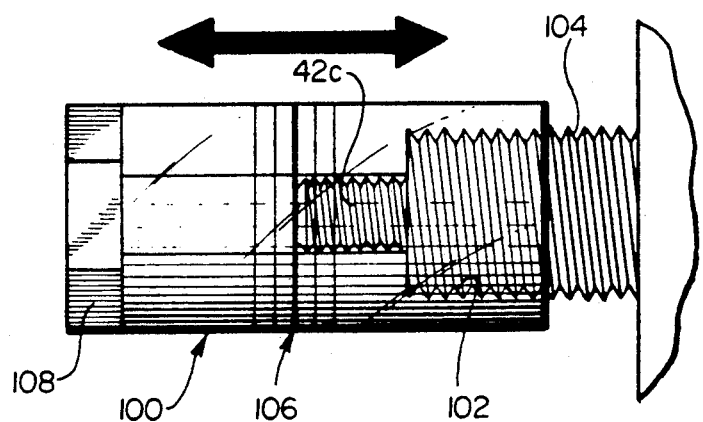
FIG. 8 is an enlarged partial view of a portion of the apparatus of FIG. 7.

Referring to FIGS. 7 and 8, yet another embodiment of an aim indicating means or assembly in accordance with the invention is illustrated. Like parts and components of the embodiment of FIGS. 7 and 8 are indicated by like reference numerals with the suffix c. In the embodiment of FIGS. 7 and 8 the aim indicating means comprises an indicator body 100 which is internally threaded at 102 for engagement with an externally threaded projection 104 from the housing or body portion 40c of the headlamp adjustment assembly 38c. This projecting threaded portion 104 extends in coaxial surrounding relation to the rearwardly projecting end part 42c of the elongate threaded adjustment member 36c; however, the two are not engaged, such that the elongate threaded member 36c freely advances and retracts relative to a smooth, relatively enlarged through bore in the projecting member or portion 104. In this regard, the member 104, may be suitably affixed or may in fact be molded integrally with the body 40c. Preferably at least a portion of the indicator body 100 is transparent and on this portion suitable indicia, preferably in the form of one or more circumferential lines 106 are inscribed or otherwise marked. The indicator body 100 terminates in a driver head portion 108 of any desired configuration for engagement by a suitable complementary tool for threadably advancing and retracting the same relative to the threaded projection 104.

In operation, the outer end portion 42c of the elongate adjustment member and its relative alignment with the indicia markings 106 form the aim-indicating means to indicate an aimed condition of the associated headlamp when the beam thereof is aimed as desired responsive to adjustment by the headlamp adjusting means 38c. Upon initial adjustment of the headlamp to the desired aimed condition, the driver portion 108 and threads 102 and 104 form indicator alignment means for causing the aim-indicating means or indicia 106 to align with the end portion of the projecting end 42c of shaft 36c to indicate the aimed condition. Thereafter, the aimed condition may again be achieved by adjusting only the headlamp adjusting assembly 38c until the end 42c of adjustment member or shaft 36c again aligns with the indicia or line 106 to thereby assure proper subsequent aiming of the headlamp beam.

Figure 12:
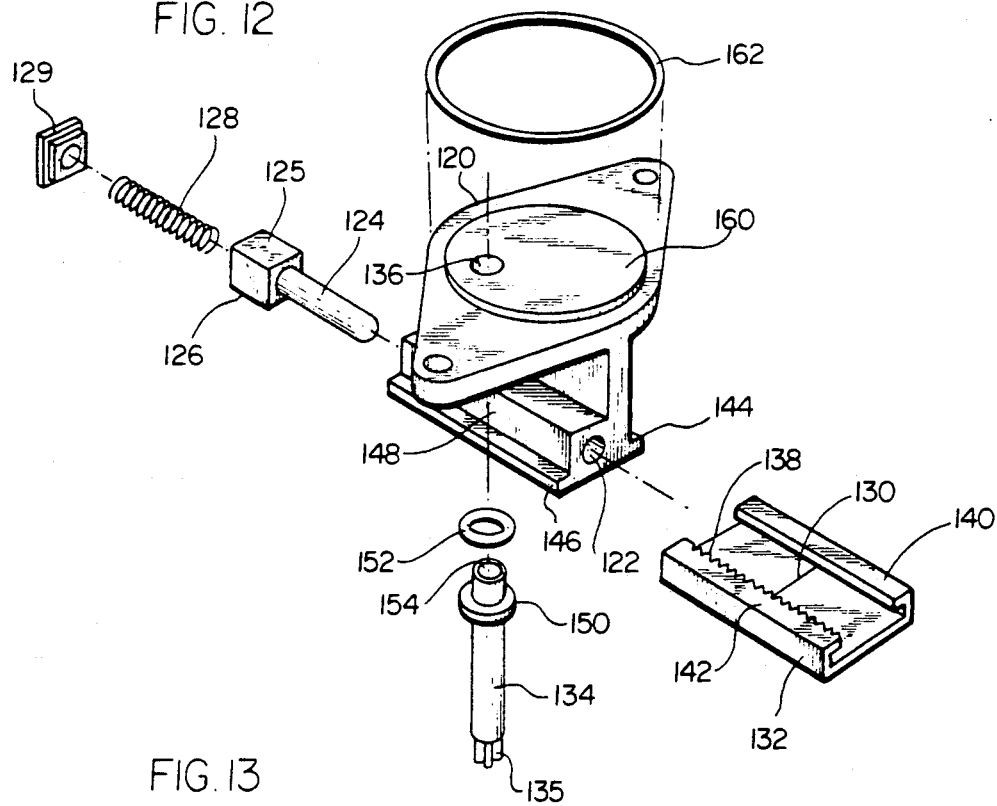
FIGS. 12 and 13 are perspective views of two slightly different forms of yet another embodiment of adjustment apparatus in accordance with the invention.
Figure 13:
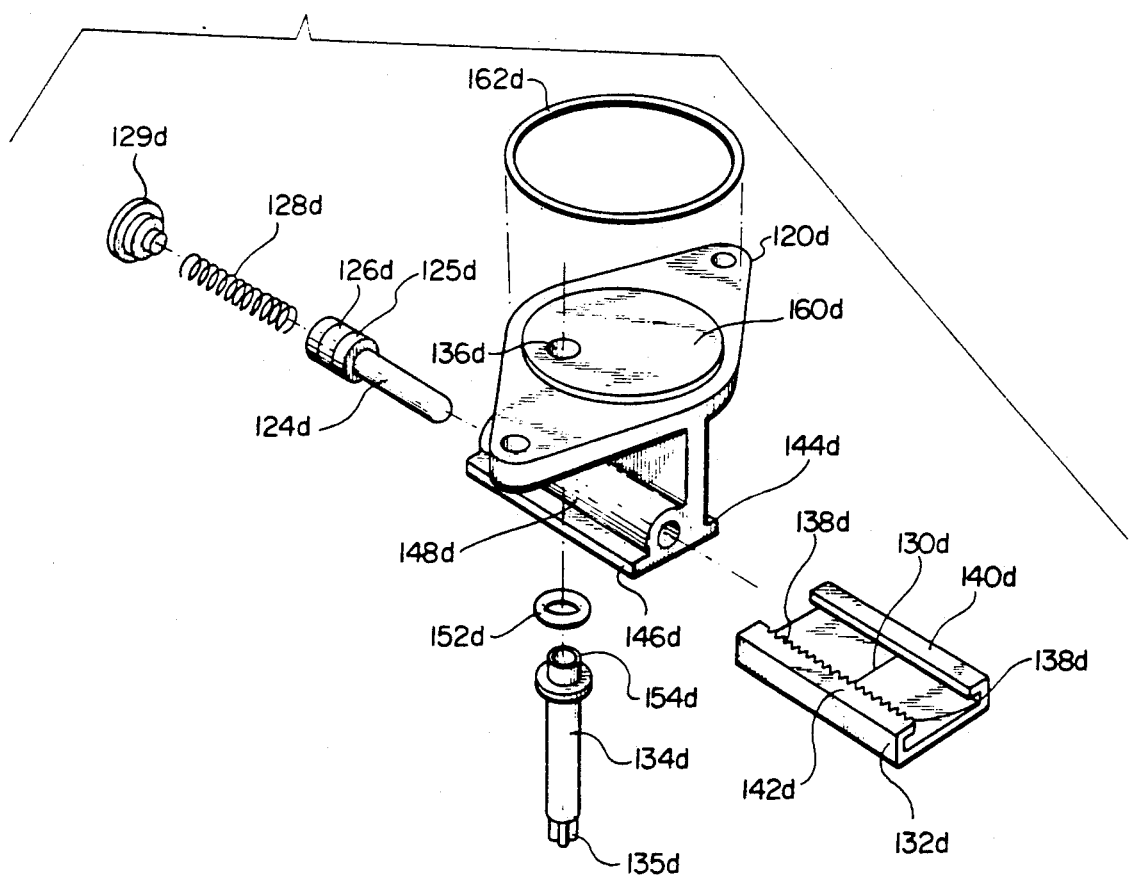

Referring now to FIGS. 12 and 13, two slightly different forms of yet a further embodiment of an adjustment apparatus in accordance with the invention are illustrated. The embodiment of FIGS. 12 and 13 will be described with reference to FIG. 12, it being understood that like parts and components in the similar form shown in FIG. 13 are designated by like reference numerals together with the suffix d. In operation, the forms of adjustment apparatus of FIGS. 12 and 13 are similar to the embodiment shown and described above with reference to FIGS. 3-6. In the embodiment illustrated in FIGS. 12 and 13, the aim-indicating means includes a housing 120 which is mounted closely adjacent the adjustment assembly 38 (not shown in FIGS. 12 and 13). The housing 120 is preferably mounted to the same support or headlamp shell member 24 as the adjustment assembly 38 as illustrated in the embodiment of FIGS. 3-6. This housing 120 defines therethrough an elongate through opening, bore or cavity 122. An elongate gage pin or indicator member 124 is mounted for slidable movement relative to the housing 120 and specifically within the cavity 122. The gage pin 124 has an enlarged base portion 125 on which are formed or inscribed or otherwise marked one or more indicia means or indicia marks 126.

Resilient means in the form of an elongate compression-type spring member 128 is mounted in the cavity 122 for bearing against the enlarged end 125 of the indicator member 124 to urge the same in the direction for engagement of its opposite and outwardly projecting end with the headlamp, and preferably with the rear surface of the headlamp reflector portion 26 (not shown in FIG. 12). The opposite end of the spring 128 bears against an end cap 129, which seals one end of the elongate through opening or cavity 122. This engagement is similar to that described for the embodiment of FIGS. 3-6 above, such that as the headlamp adjusting means operates to move the reflector of the headlamp, the indicator member 124 and its indicia 126 will also be moved in unison with the reflector.

In order to give an indication of the aimed or non-aimed condition of the headlamp beam, a second indicia or indicia means is provided in the form of an indicia mark or scribe line 130 on a rack member 132. This rack member 132 is assembled for slidable movement along the housing or body 120 in a direction coaxial with the axis of the gage pin 124; that is, in the same direction as the movement of the gage pin 124 under the influence of spring 128 and/or with the reflector of the headlamp, responsive to adjustment thereof by the headlamp adjusting means.

Departing somewhat from the embodiment of FIGS. 3-6 described hereinabove, the embodiments of FIGS. 12 and 13 provide a cooperating pinion member 134 having a pinion gear 135 which extends through a suitable through bore 136 provided in the housing 120 to contact complementary teeth 138 formed on the rack member 132. In this regard, the rack member 132 has oppositely inwardly turned and facing projecting edges 140, 142 the latter of which bears the rack teeth 138. Cooperatively, a bottom portion of the housing has outwardly projecting mounting track or rail-like portions 144, 146 which slidably receive the edges 140, 142 thereabout for engaging rack member 132 thereupon. The rack teeth 138 thus generally face inwardly toward a half bearing element or portion 148 which also forms a bearing surface for a lower end of the pinion member 134 and its pinion gear 135. An upper end of pinion member 134 is provided with a radially projecting annular lip 150 which mounts a sealing O-ring 152 to seal the same in engagement with an upper portion of bore 136. Additionally, a drive member 154 of suitable form is formed at the upper portion of the pinion member 134 and is accessible at an upper end portion of the bore 136 for rotation by a suitable mating tool to achieve movement of the rack 132 such that the scribe line or indicia mark 130 thereon may be moved into alignment with a corresponding indicia marking 126 on the gage pin 124.

The housing 120 is provided with an upper cap or closure member 160 which bears against a suitable peripheral sealing O-ring 162 to seal the same relative to the housing 120 and upper or outlet portion of bore 136 formed therethrough. Cap 160 thus also bears against and seals with O-ring 152 associated with the pinion 134. The housing 120, cap 160 and rack 132, or at least suitable portions thereof, are formed of a clear plastic or other suitable transparent material to permit ready viewing of the respective indicia lines 130 and 126.

In operation, the headlamp adjusting means 38 (not shown in FIGS. 12 and 13) is operated until the headlamp or reflector 26 (not shown in FIGS. 12 and 13) is in the desired aimed condition. The pinion member 134 is rotated to move the rack 132 into a position where its indicia marking 130 aligns with a desired indicia marking 126 of the indicator member or gage pin 124. Thereafter, in operation, when it is desired to realign the headlamp in use, it is necessary only to adjust the headlamp adjusting means 38 until the two markings or indicia lines 126 and 130 again align, to assure proper subsequent aiming.

The housing 120 is provided with an upper cap or closure member 160 which bears against a suitable peripheral sealing O-ring 162 to seal the same relative to the housing 120 and upper outlet portion of bore 136 formed therethrough, which in turn bears against and seals with O-ring 152 associated with the pinion 134. All or suitable parts of the housing 120, cap 160 and rack 132 are formed of a clear plastic or other suitable transparent material to permit ready viewing of the respective indicia lines 130 and 126.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A headlight aiming apparatus for attachment to an automotive headlamp apparatus comprising a support member which is rigidly mountable to an automotive vehicle, a reflector which is mounted to the support member for pivotal motion about at least one of a horizontal axis and vertical axis for aiming of the headlamp beam, and headlamp adjusting means operatively coupled with said headlamp for producing movement of said reflector relative to said support member for aiming of the headlamp beam; said aiming apparatus comprising: aim-indicating means comprising a first aiming indicia movable in unison with said headlamp adjusting means and a second aiming indicia mounted to a surface which does not move either when the reflector is adjusted or inadvertently goes out of adjustment or when the headlamp adjusting means is adjusted, such that said second aiming indicia is independent of said headlamp adjusting means and of the adjustment of said reflector; and indicator alignment means for moving one of said first and second indicia independently of said headlamp adjusting means for bringing the first and second aiming indicia into registry with each other when the reflector is in a condition wherein the beam is aimed as desired responsive to adjustment by said headlamp adjusting means; whereby said headlamp adjusting means may be adjusted thereafter as necessary until said aim-indicating means indicates said aimed condition to thereby assure proper subsequent aiming of the headlamp beam.

2. The apparatus of claim 1 said aim-indicating means comprises a housing mounted closely adjacent said adjusting means, an elongate cavity generally defined within said housing, an indicator member mounted for slidable movement relative to said cavity and wherein said first aiming indicia comprises first indicia means on said indicator member; resilient means for urging said indicator member into engagement with a given surface of said reflector such that the headlamp adjusting means will operate to move the indicator member relative to the housing such that said indicia means thereon is also moved in unison with said reflector.

3. Apparatus according to claim 2 wherein said second aiming indicia comprises second indicia means alignable with said first indicia means when said headlamp is in the desired aimed condition.

4. Apparatus according to claim 2 and further including mounting means for mounting said housing to said support member and wherein said mounting means comprises an elongate tubular, open-ended body of complementary configuration for receiving said housing therethrough, radially outwardly projecting locking members for engagement with a complementary through mounting aperture formed through said support member for receiving said mounting means therethrough, and gasket means engageable intermediate said mounting means and said housing for forming a seal therebetween.

5. Apparatus according to claim 4 wherein said locking members are located relative to said gasket for compressing the gasket into sealing engagement with said support member, said locking members being inwardly compressible to permit insertion of the mounting means through the mounting aperture for snapping engagement of the locking members therewith, and compression of said gasket; and said mounting means and said housing including complementary threaded portions for bidirectional threadable movement of said housing relative to said mounting member.

6. Apparatus according to claim 2 wherein said first indicia means comprises an indicia mark affixed to a surface of said indicator member and wherein said second aiming indicia comprises second indicia means alignable with said indicia mark when said headlamp is in an aimed condition.

7. Apparatus according to claim 6 wherein said alignment means includes means for moving said second indicia means for aligning the same with said indicia mark when said headlamp beam is in said desired aimed condition.

8. Apparatus according to claim 7 wherein said alignment means comprises a threaded surface on said housing generally coaxial with the axis of movement of said indicator member relative thereto, for movement of said housing along said axis for aligning said complementary indicia with said indicia mark.

9. Apparatus according to claim 2 and further including cooperating retaining means on said indicator means and on said housing for retaining at least a portion of said indicator means within said housing and for defining a limit of movement of said indicator means in a direction outwardly of said housing.

10. Apparatus according to claim 1 wherein said headlamp adjusting means comprises a fixed member and an elongate threaded member rotatably mounted to said fixed member and having one end attached to said reflector for pivotally moving the same to achieve headlamp beam aiming and an opposite free end extending outwardly of said fixed member; and wherein said aim-indicating means comprises an indicator body having said first aiming indicia thereupon and having thread means threadably engageable with said projecting portion of said elongate threaded member and comprising said indicator alignment means; and said second aiming indicia being located closely adjacent said projecting portion of said elongate threaded member; said indicator body being threadably movable for alignment of the respective first and second indicia means when the headlamp is in the desired aimed condition.

11. Apparatus according to claim 10 wherein said thread means of said indicator body is of a softer material than said elongate threaded member of the headlamp adjusting means so as to create a prevailing torque and to substantially resist relative threaded movement therebetween due to vibration or the like.

12. Apparatus according to claim 10 wherein said second aiming indicia means is mounted to said fixed member of said headlamp adjusting means.

13. Apparatus according to claim 10 wherein said second aiming indicia is integrally formed with said fixed member of said headlamp adjusting means.

14. Apparatus according to claim 1 wherein said headlamp adjusting member comprises a fixed member and an elongate threaded member rotatably mounted to said fixed member having one end attached to said reflector for pivotally moving the same in response to threadable movement thereof relative to said fixed member to achieve headlamp beam aiming, said elongate threaded member having an opposite free end extending outwardly of said fixed member in a direction generally opposite its engagement with said reflector; and said fixed member including a projecting threaded portion coaxially surrounding said free end of said elongate threaded member; and wherein said aim-indicating means comprises an indicator body having thread means threadably engageable with said projecting threaded portion of said fixed member; said indicator body having a transparent portion having said second aiming indicia thereupon, said second aiming indicia being alignable with the terminal end portion of said free end of said elongate threaded member to indicate an aimed condition of said headlamp beam in response to threadable movement of said indicator body relative to said fixed housing member and comprising said indicator alignment means.

15. A headlight aiming apparatus for attachment to an automotive headlamp assembly comprising a frame member which is rigidly mountable to an automotive vehicle, a headlamp which is mounted to the frame member for pivotal motion about at least one of a horizontal axis and a vertical axis for aiming of the headlamp beam, and headlamp adjusting means operatively coupled with said headlamp for producing movement of said headlamp relative to said frame member for aiming of the headlamp beam; said aiming apparatus comprising: aim-indicating means comprising a first aiming indicia movable in unison with said headlamp adjusting means and a second aiming indicia mounted to a surface which does not move either when the headlamp is adjusted or inadvertently goes out of adjustment or when the headlamp adjusting means is adjusted, such that said second aiming indicia is independent of said headlamp adjusting means and of the adjustment of said headlamp; and indicator alignment means for moving one of said first and second indicia means independently of said headlamp adjusting means for bringing the first and second aim indicia means into registry with each other when the headlamp is in a condition wherein the beam is aimed as desired responsive to adjustment by said headlamp adjusting means; whereby said headlamp adjusting means may be adjusted thereafter as necessary until said aim-indicating means indicates said aimed condition to thereby assure proper subsequent aiming of the headlamp beam.

* * * * *